United States Patent [19]

Hunsucker et al.

[11] 4,219,631

[45] Aug. 26, 1980

[54] MODIFIED UREA-FORMALDEHYDE RESIN

[75] Inventors: Jerry H. Hunsucker; Milton E. Woods, both of Terre Haute, Ind.

[73] Assignee: International Minerals & Chemical Corp., Terre Haute, Ind.

[21] Appl. No.: 41,119

[22] Filed: May 21, 1979

Related U.S. Application Data

[63] Continuation-in-part of Ser. No. 25,502, Mar. 30, 1979, abandoned.

[51] Int. Cl.$^2$ .......................... C08G 6/00; C08L 61/02
[52] U.S. Cl. .................................... 525/398; 525/509
[58] Field of Search ................................ 525/398, 509

[56] References Cited

U.S. PATENT DOCUMENTS

| | | | |
|---|---|---|---|
| 2,163,264 | 6/1939 | Sussenguth | 525/398 |
| 2,240,271 | 4/1941 | Scheib | 525/398 |
| 4,018,740 | 4/1977 | Kruglikov et al. | 525/509 |
| 4,102,840 | 7/1978 | Pusch | 525/509 |

*Primary Examiner*—Lucille M. Phynes
*Attorney, Agent, or Firm*—Robert H. Dewey

[57] ABSTRACT

A resinous product comprising a curable urea-formaldehyde resin modified by a nitroalkanol and having particular utility for treating textiles and non-woven cellulose products to provide permanent press and wrinkle-resistant characteristics.

27 Claims, No Drawings

MODIFIED UREA-FORMALDEHYDE RESIN

CROSS REFERENCE TO RELATED APPLICATIONS

This application is a continuation-in-part of Applicants' copending application Ser. No. 25,502 filed Mar. 30, 1979 now abandoned.

BACKGROUND OF THE INVENTION

This invention relates to urea-formaldehyde resins. In a particular aspect this invention relates to modified urea-formaldehyde resins having particular utility for treating textiles and non-woven cellulose products.

The importance of dimensional stability, such as wrinkle resistance and durable press properties in textile fabrics and non-woven cellulose products are well established and are of great importance and economic value to the textile industry. The majority of textile articles, both wearing apparel and household articles, available in the market-place exhibit these properties to some beneficial degree. Although many synthetic fibers inherently possess resiliency and wrinkle resistance, fabrics containing cellulose fibers must be chemically treated to acquire these important properties needed for the modern textile market.

In addition to wrinkle resistance and permanent press properties, it is highly desirable that non-woven cellulosic products display good wet strength characteristics. Yet most paper goods are especially deficient in wet strength unless they are treated.

The principal chemical treatments which produce wrinkle resistance and durable press properties in cellulose containing textiles and non-woven products are those in which the cellulose molecules are crosslinked, generally by reaction of a di- or polyfunctional agent with the cellulose. Many of the agents employed by the textile processing industry to produce durable press properties in cellulosic fabrics are N-methylol adducts. To enhance the reactions between the cellulose and these adducts many compounds or catalysts may be employed.

At present, urea-formaldehyde resins modified with glyoxal are used in large volume. However, glyoxal is a high-cost raw material and it would be advantageous to employ a more economical modified urea-formaldehyde resin.

SUMMARY OF THE INVENTION

It is an object of this invention to provide a modified urea-formaldehyde resin.

It is another object of this invention to provide modified urea-formaldehyde having particular utility for treating textiles and non-woven cellulose products.

Other objects of this invention will be apparent to those skilled in the art from the description herein.

It is the discovery of this invention to provide a resinous product comprising a curable urea-formaldehyde resin modified with from 0.25 to 3.0 moles per mole of urea of a nitroalkane or of a nitroalkanol, said nitroalkanol being represented by the formula

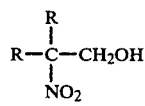

where R is hydrogen, methyl, ethyl or hydroxymethyl.

In place of the nitroalkanol, there can be substituted a nitroalkane of 1–3 carbon atoms in an amount equimolar to the amount of nitroalkanol employed. Furthermore, a mixture in any proportion of nitroalkane and nitroalkanol of the above formula can be employed.

DETAILED DISCUSSION

The resinous product of this invention is a curable urea-formaldehyde resin modified by reaction with a nitroalkanol or with a nitroalkane or mixture thereof. The term "curable" is intended to mean that the resin is incompletely polymerized and is capable of further reaction with crosslinking agents and the like.

Generally, but not necessarily, the modified resin is prepared by reacting the urea and formaldehyde in a mole ratio of about 1 to 1–5 respectively at a neutral to alkaline pH, i.e. at a pH of from about 7 to 11. Then the nitroalkanol is added and the reaction is continued until a solution clear at room temperature is obtained. The pH is then adjusted to neutral or slightly acidic, e.g. 5–7 and heating is continued to finish the reaction.

In another embodiment of the invention, the formaldehyde and urea are reacted as above and a nitroalkane of 1 to 3 carbons atoms, or a mixture of nitroalkane and nitroalkanol, is added. The remainder of the reaction is carried out as described.

In a third embodiment of the invention, the nitroalkanol is first reacted with the urea at neutral to alkaline pH and then the formaldehyde is added and the reaction is carried to completion as described above.

In a fourth embodiment of the invention, the formaldehyde and nitroalkane are reacted at alkaline pH, then urea is added and the reaction is continued to completion.

In still another embodiment, it is contemplated that alkylolated ureas are used in place of urea on an equimolar basis. These alkylolated ureas are known in the art and can be the mono- or dialkylolated compounds. The alkylol chain length can be of from 1 to 5 carbon atoms. Such ureas yield resins especially useful as adhesives.

It is also contemplated that, rather than prepare the urea-formaldehyde portion of the resin, a commercially-available, curable resin can be employed in the reaction.

It is still yet another embodiment of this resin to react the urea-formaldehyde resin with up to 1.5 moles of glyoxal per mole of urea before reacting with the nitroalkanol or nitroalkane or mixture thereof. It is also contemplated that melamine can be employed as a cross-linking agent.

The formaldehyde used in the practice of this invention is preferably the 37% commercial grade. However, other formaldehyde sources such as solutions of formaldehyde in lower aliphatic alcohols and paraformaldehyde can also be used.

The nitroalkanols useful in the practice are commercially available and include, but are not limited to, tris(-hydroxymethyl)nitromethane; 2-nitro-2-methyl-1,3-propanediol; 2-nitro-2-ethyl-1,3-propanediol; 2-nitro-1-butanol and, preferably, 2-nitro-2-methyl-1-propanol. Mixtures of these nitroalkanols can also be used. It is understood that the invention is not limited to these nitroalkanols. Other nitroalkanols are known in the art and regarded as being the obvious equivalents of the foregoing.

The nitroalkanes useful in the practice of this invention are commercially available and include nitromethane, nitroethane, 1-nitropropane, 2-nitropropane and mixtures thereof. The total nitroalkane is used in a proportion of about 0.5-1.0 mole, preferably 0.75 mole, per mole of urea. It is understood that the invention is not limited to these nitroalkanes. Others are known in the art and are regarded as being the obvious equivalents of the foregoing.

The resins of this invention are prepared by the preferred process of reacting the formaldehyde and urea at a pH of about 7-11, preferably 8.0-10.5 and particularly at about 10.0-10.5. The pH can be provided by any alkaline reagent many of which are known, viz. inorganic carbonates, bicarbonates, oxides or hydroxides, including those of ammonia, sodium, potassium and lithium. Sodium hydroxide is preferred.

The reaction of formaldehyde and urea is preferably, but not necessarily, carried out under alkaline conditions at elevated temperatures of from about 40° C. to reflux temperature at ambient pressure, preferably at reflux temperature. When the reaction is complete, the temperature, if at reflux, is preferably lowered somewhat, e.g. to about 75°-80° and then the nitroalkane, or mixture thereof, is added, preferably slowly. After the addition is finished, the reaction is continued at about 75°-80° C. until a solution clear at room temperature is obtained. The reaction mixture is further cooled to about 55°-65° C. and the pH is adjusted to about 5.0-7.0. The pH adjustment can be effected with any watersoluble mineral or organic acid. Generally a dilute acid such as dilute hydrochloric, phosphoric, sulfuric, p-toluene sulfonic, etc. will be used. The heating period is then continued at 55°-60° C. about one more hour to ensure complete reaction. The reaction product is then allowed to cool and if desired can be diluted to about 25-45% solids, which hastens the cooling process.

A 25% solution of the resin is preferred for treating the textile or other non-woven, cellulosic object. Preferably it is used with a catalyst, e.g. magnesium or zinc chloride. It is convenient to prepare the catalyst as a 25% aqueous solution and mix one part of the catalyst solution with four parts of the 25% resin solution. The textile or other non-woven, cellulosic object is then saturated with the mixture, pressed to about a 60% wet pickup, then heated at, e.g., about 350° F. to cure the resin.

It is contemplated that the products and objects which will benefit from the wrinkle resistance conferred by the resin of the present invention will include but will not be limited to those made from natural fibers, principally wool and cellulose, both woven and non-woven. Of the woven fibers, cotton fabrics are the ones which are expected to receive the most benefit. Non-woven fabrics are usually made from cellulose fibers, e.g. wood fibers, and are used extensively. While much of it goes to disposable items where wrinkle resistance may not be of great importance, still the market for durables is increasing especially in clothing interliners, bedding, carpets, draperies, etc., where wrinkle resistance is important. Actually, it is contemplated that any cellulose containing product, such as paper goods will benefit from treatment with the resin, and the term fabric as used herein is intended to encompass such cellulose-containing product.

The invention will be better understood with reference to the following examples. It is understood that the examples are intended for illustration only and it is not intended that the invention be limited thereby.

EXAMPLE 1

Into a reaction vessel fitted with a stirring means and a heat source there was delivered 534 g of 37% formaldehyde (6 moles) and 180 g of urea (3 moles). The mixture was stirred until homogeneous, then the pH was adjusted to 8.0 with dimethylaminomethylpropanol. The mixture was heated to 45° C. for 70 minutes, then to 60° C. at which time the pH was adjusted to 8.5-9.0 and a mixture containing 100.1 g of 2-nitropropane and 33.39 g of 1-nitropropane (total of 1.5 moles) was added dropwise. The reaction was continued at 60° C. for 30 minutes after which the product was cooled and diluted to 25% solids. The pH was adjusted to 7.0 using acetic acid. There was then added 25% of magnesium chloride catalyst based on the solids content.

The wrinkle recovery was determined by Test Method 66-1968 of the American Association of Textile Colorists and Chemists. A piece of cotton cloth, unsized, was dipped into the resin solution, patted dry and stretched, then placed in an oven at 355° F. for ninety seconds. Ten specimens, 40 mm long and 15 mm wide, were cut from the cloth, five with their long dimension parallel to the warp and five with their long dimension parallel to the filling. The recovery angle was then determined as set forth in the test method on test specimens. The values were averaged and expressed as total recovery angle. Similar specimens were treated with a commercial product, "Permafresh LP", marketed by Sun Chemical Product for use as control. The results obtained are given in Table 1.

A sample of non-woven cellulosic material is treated with this resin. It has a high wet strength and good dimensional stability.

EXAMPLE 2

The experiment of Example 1 was repeated in all essential details except that after addition of the nitroalkanes, the mixture was heated for one hour instead of 30 minutes. The results are given in Table 1.

EXAMPLE 3

Into a reaction vessel fitted with a stirring means and a heat source, there was delivered 178 g of 37% formaldehyde (2 moles) and 60 g of urea (1 mole). The ingredients were thoroughly mixed and the pH was adjusted to 8.0-8.2 using dimethylaminomethylpropanol. The temperature was raised to 45° C. for 70 minutes and the pH was readjusted to 8.5-9.0. A mixture containing 11.3 g of 1-nitropropane and 33.37 g of 2-nitropropane (a total of 0.5 moles of nitroalkane) was added dropwise over a 45 minute period. The pH was then adjusted to 7.0 and was then diluted to 25% solids.

Cotton cloth was treated as described in Example 1 and the recovery angle was determined. The result is given in Table 1.

A sample of non-woven cellulosic material is treated with this resin. It has a high wet strength and good dimensional stability.

EXAMPLE 4

The experiment of Example 3 was repeated in all essential details except 44.5 g of the nitropropanes were employed in a 1:1 ratio. The results are given in Table 1.

EXAMPLE 5

The experiment of Example 3 was repeated in all essential details except that after the nitroalkanes were added, the heating period was continued for 30 minutes. The results obtained are given in Table 1.

Table 1

| Example Number | Color Gardner | Recovery Angle, ° | Tensile Strength |
| --- | --- | --- | --- |
| 1 | — | 258 | 31 |
| 2 | — | 266 | 32 |
| 3 | 1 | 243 | 20 |
| 4 | 1 | 225 | 22.5 |
| 5 | 1 | 265 | 35 |
| Control | 1 | 231 | 14.5 |

EXAMPLE 6

Aqueous 37% formaldehyde 324.3 g (4 moles of formaldehyde) was delivered to a 3-necked round bottom flask equipped with a stirrer, a thermometer, condenser and heat source. The pH was adjusted to 10.5 with 10% sodium hydroxide solution and then heated to reflux. Urea 60 g (1 mole) was added and heating at reflux was continued for 15 minutes. The mixture was cooled to about 78° C. and 2-nitropropane 67.5 g (0.75 mole) was added. The temperature was held constant until the mixture became homogeneous (about 15–20 minutes). The mixture was then cooled to about 60° C. and the pH was adjusted to 5.0 with phosphoric acid and heating at 60° C. was continued for an hour. Deionized water was added in a quantity sufficient to produce a 25% total solids content.

A 25% solution of catalyst was prepared by dissolving 100 g of $MgCl_2 \cdot 6H_2O$ in 87.4 g of water. Four parts of the resin solution was mixed with one part of catalyst and cloth samples, as described in Example 1, were treated with the resulting solution, then pressed to a 60% wet pickup. On drying this procedure gave 9–12% of resin, dry weight, on the cloth. The cloth samples were then stretched taut and were baked at 225° F. for two minutes and at 325° F. for three minutes. The recovery angle was then determined. Similarly, cloth samples were treated with a commercially available product (Permafresh LF) as a control. The results obtained are given in Table 2.

A sample of non-woven cellulosic material is treated with this resin. It has a high wet strength and good dimensional stability.

EXAMPLES 7–9

The experiment of Example 6 was repeated in all essential details except that in place of 4 moles of formaldehyde, there was substituted 3.9, 3.8 and 3.7 moles respectively. The results are given in Table 2.

Table 2

| Example Number | Formaldehyde moles | Recovery Angle, ° | Tensile Strength |
| --- | --- | --- | --- |
| 6 | 4 | 306 | 23.5 |
| 7 | 3.9 | 297 | 26.0 |
| 8 | 3.8 | 295 | 23.5 |
| 9 | 3.7 | 320 | 20.5 |
| Control |  | 277 | 15.0 |

EXAMPLES 10–15

The experiment of Example 6 was repeated in all essential details except that the 2-nitropropane content was varied from 1 mole (90 g) to 0.95, 0.90, 0.85, 0.80 and 0.75 for Examples 10–15 respectively. The results are given in Table 3.

Table 3

| Example Number | 2-NP moles | Recovery Angle, ° | Tensile Strength |
| --- | --- | --- | --- |
| 10 | 1.00 | 296 | 17.8 |
| 11 | .95 | 274 | 17.4 |
| 12 | .90 | 299 | 18.3 |
| 13 | .85 | 288 | 21.4 |
| 14 | .80 | 286 | 22.7 |
| 15 | .75 | 306 | 23.4 |

EXAMPLE 16

Formaldehyde, 37% aqueous solution, 810 g (10 moles) was delivered to a round bottom flask and urea 120 g (2 moles) was added. A stirrer, condenser and thermometer were attached and the pH was adjusted to 10.52 using 50% aqueous sodium hydroxide. The flask and contents were heated to 60° C. while stirring and were maintained at that temperature for 4 hours (only 2 hours was intended). The pH was then adjusted to 9.6 using 20% hydrochloric acid solution and 2-nitro-2-methyl-1-propanol, 203.4 g of a 64.4% aqueous solution (110 moles), was added. After 15 minutes, a sample cooled to room temperature was clear. Additional hydrochloric acid to adjust the pH to 6.0 was added and the temperature was maintained at 60° C. for one hour longer. It was then diluted with 75.5 ml of water.

A sample of the foregoing solution was treated with magnesium chloride catalyst and the resulting solution was used to treat a standard textile sample. The recovery angle was 296°. Similarly, a textile sample treated with a zinc nitrate-catalyzed resin had a recovery angle of 300°.

A sample of non-woven cellulosic material is treated with this resin. It has a high wet strength and good dimensional stability.

EXAMPLE 17

The experiment of Example 16 was repeated in all essential details except that the weight of formaldehyde was reduced to 648 g (8 moles), the nitromethylpropanol was increased 277 g (1.5 moles) and the heating period at pH 10.5 was 2 hours. The recovery angle of the magnesium chloride catalyzed resin-treated fabric was 289° and that of the zinc nitrate catalyzed was 304°.

EXAMPLE 18

The experiment of Example 17 was repeated in all essential details except that the amount of 2-nitro-2-methyl-1-propanol was increased to 375 g (1 mole). When magnesium chloride catalyst was used, a recovery angle of 299° was obtained and when zinc nitrate was used, the recovery angle was 294°.

EXAMPLE 19

The experiment of Example 18 was repeated in all essential details except that the amount of NMP was reduced to 203 g (1 mole). When magnesium chloride was used as the catalyst, the recovery angle was 295°. When zinc nitrate was used as the catalyst, the recovery angle was 299°.

EXAMPLE 20

The experiment of Example 17 was repeated in all essential details except that the amounts of urea and formaldehyde were reduced to 60 g (1 mole) and 325 g (4 moles) respectively and after they had been heated for 2 hours, 72 g of a 40% solution of glyoxal (0.5 mole) was added and the heating was continued an additional hour at 50° C. The pH was reduced to 9.0 and heating was continued for another hour. The pH had dropped to 8.35 so it was increased to 9.2 and 2-nitropropane 66.7 g (0.75 mole) was added. After 15 minutes, the pH was reduced to 6.03 and after another hour of heating, the reaction was terminated. When magnesium chloride was used as the catalyst, the recovery angle was 278° and when zinc nitrate was used, the recovery angle was 287°.

A sample of non-woven cellulosic material is treated with this resin. It has a high wet strength and good dimensional stability.

EXAMPLE 21

The experiment of Example 16 is repeated in all essential details except that the amount of 2-nitro-2-methyl-1-propanol was reduced to 55 moles and 2-nitropropane, 55 moles, is added. A textile sample is treated with this resin. It has a high recovery angle when tested for wrinkle resistance. A sample of paper product is treated with this resin. It has high wet strength and good dimensional stability.

We claim:

1. A resinous product comprising a curable ureaformaldehyde resin modified with from 0.25 to 3.0 moles of a nitroalkanol per mole of urea, said nitroalkanol being represented by the formula

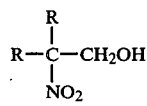

where R is hydrogen, methyl, ethyl or hydroxymethyl.

2. The resinous product of claim 1 wherein the urea is provided by the methyl, ethyl, propyl or butyl ether of urea.

3. The resinous product of claim 1 wherein the urea-formaldehyde resin is modified with up to 1.5 mole of glyoxal per mole of urea prior to reaction with the nitroalkanol.

4. The product of claim 1 wherein the nitroalkanol is tris(hydroxymethyl)nitromethane.

5. The product of claim 1 wherein the nitroalkanol is 2-nitro-2-methyl-1,3-propanediol.

6. The product of claim 1 wherein the nitroalkanol is 2-nitro-2-ethyl-1,3-propanediol.

7. The product of claim 1 wherein the nitroalkanol is 2-nitro-2-methyl-1-propanol.

8. The product of claim 1 wherein the nitroalkanol is 2-nitro-1-butanol.

9. A resinous product comprising a curable ureaformaldehyde resin modified with a nitroalkane of 1 to 3 carbon atoms or mixture thereof in a mole ratio of from 0.25 to 3.0 per mole of urea.

10. The product of claim 9 wherein the nitroalkane is nitromethane.

11. The product of claim 9 wherein the nitroalkane is nitroethane.

12. The product of claim 9 wherein the nitroalkane is nitropropane.

13. A method for the preparation of the resinous product of claim 1 comprising the steps of (a) reacting urea and formaldehyde in a mole ratio of about 1:1–5 respectively at neutral or alkaline pH; (b) reacting the product of step (a) with from 0.25 to 3 moles per mole of urea of a nitroalkanol represented by the formula

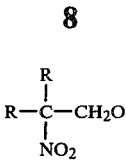

where R is hydrogen, methyl, ethyl or hydroxymethyl; (c) adjusting the pH to about 5 to 7, and (d) completing the reaction.

14. A method for the preparation of the curable resinous product of claim 9 comprising the steps of (a) reacting formaldehyde and urea in a mole ratio of about 1–5:1 respectively at a neutral or alkaline pH; (b) reacting the product of step (a) with 0.25–3.0 moles of a nitroalkane of 1 to 3 carbon atoms or mixture thereof until a solution clear at room temperature is obtained; (c) adjusting the pH to about 5 to 7, and (d) completing the reaction.

15. A method for the preparation of the resinous product of claim 1 comprising the steps of (a) reacting urea with from about 0.25 to 3 moles of a nitroalkanol represented by the formula

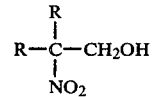

wherein R is hydrogen, methyl, ethyl or hydroxymethyl; (b) reacting the product of step (a) with from about 1 to 5 moles of formaldehyde at a pH of from 7 to about 11; (c) adjusting pH to about 5 and (d) completing the reaction.

16. A method for the preparation of the resinous product of claim 9 comprising the steps of (a) reacting formaldehyde with a nitroalkane of from 1 to 3 carbon atoms in a mole ratio of from 1 to 5 moles of formaldehyde per mole of the urea of step (b) and from 0.25 to 3.0 moles nitroalkane per mole of urea at a pH of about 7 to 11; (b) reacting the product of step (a) with about 1 mole urea; (c) adjusting the pH to about 5 to 7 and (d) completing the reaction.

17. The method of any of claims 13, 14, 15 or 16 wherein the alkaline pH is 10.0 to 10.5.

18. The method of claim 14 or claim 16 wherein the nitroalkane is added in a mole ratio of about 0.75 to 1.0 to one of urea.

19. The method of claim 14 or claim 16 wherein the reaction with the nitroalkane is carried out at about 75°–80° until a solution clear at room temperature is obtained.

20. The method of claim 14 wherein the pH is adjusted to about 5 when the clear solution is obtained.

21. The method of either claim 14 or 16 wherein the nitroalkane is nitromethane.

22. The method of either claim 14 or 16 wherein the nitroalkane is nitroethane.

23. The method of either claim 14 or 16 wherein the nitroalkane is 1-nitropropane.

24. The method of either claim 14 or 16 wherein the nitroalkane is 2-nitropropane.

25. The method of claim 14 or claim 16 wherein glyoxal is reacted with the product of step (a) in an amount of up to 1.5 moles per mole of urea.

26. The resinous product of claim 9 wherein the urea-formaldehyde resin is modified with up to 1.5 moles of glyoxal per mole of urea prior to reaction with the nitroalkane.

27. The resinous product of either of claims 1 or 9 wherein the urea-formaldehyde resin is modified with a mixture of nitroalkane and nitroalkanol in any proportion.

* * * * *